US012147255B2

(12) United States Patent
Tsao et al.

(10) Patent No.: US 12,147,255 B2
(45) Date of Patent: Nov. 19, 2024

(54) LDO/BAND GAP REFERENCE CIRCUIT

(71) Applicant: Taiwan Semiconductor Manufacturing Company, Ltd., Hsinchu (TW)

(72) Inventors: Szu-Chun Tsao, Hsinchu (TW); Jaw-Juinn Horng, Hsinchu (TW); Bindu Madhavi Kasina, Hsinchu (TW); Yi-Wen Chen, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/296,474

(22) Filed: Apr. 6, 2023

(65) Prior Publication Data

US 2023/0244258 A1 Aug. 3, 2023

Related U.S. Application Data

(63) Continuation of application No. 17/458,707, filed on Aug. 27, 2021, now Pat. No. 11,669,115.

(51) Int. Cl.

| | |
|---|---|
| ***G06F 1/26*** | (2006.01) |
| ***G05F 1/46*** | (2006.01) |
| ***G05F 3/26*** | (2006.01) |
| ***G05F 3/30*** | (2006.01) |

(52) U.S. Cl.

CPC .............. *G05F 1/468* (2013.01); *G05F 1/461* (2013.01); *G05F 1/465* (2013.01); *G05F 3/262* (2013.01); *G05F 3/30* (2013.01)

(58) Field of Classification Search

None

See application file for complete search history.

(56) References Cited

U.S. PATENT DOCUMENTS

| | | | |
|---|---|---|---|
| 6,894,473 | B1 | 5/2005 | Le et al. |
| 6,989,660 | B2 | 1/2006 | Mauthe |
| 8,278,995 | B1 | 10/2012 | Vu et al. |
| 8,294,450 | B2 | 10/2012 | Lee et al. |
| 9,588,539 | B2 | 3/2017 | Ye et al. |
| 10,156,860 | B2 | 12/2018 | Zhou |
| 10,198,014 | B2 | 2/2019 | Tyagi et al. |
| 10,649,482 | B1 | 5/2020 | Cheng et al. |
| 11,422,578 | B2 | 8/2022 | Liu et al. |

*Primary Examiner* — Jeffrey S Zweizig

(74) *Attorney, Agent, or Firm* — Jones Day

(57) ABSTRACT

Systems and methods as described herein may take a variety of forms. In one example, systems and methods are provided for a circuit for powering a voltage regulator. A voltage regulator circuit has an output electrically coupled to a gate of an output driver transistor, the output driver transistor having a first terminal electrically coupled to a voltage source and a second terminal electrically coupled to a first terminal of a voltage divider, the voltage divider having an second terminal electrically coupled to ground, and the voltage divider having an output of a stepped down voltage. A power control circuitry transistor has a first terminal electrically coupled to the voltage source, the power control circuitry transistor having a second terminal electrically coupled to the gate terminal of the output driver transistor, and the power control circuitry transistor having a gate terminal electrically coupled to a status voltage signal.

20 Claims, 15 Drawing Sheets

LDO/BAND GAP REFERENCE CIRCUIT

CROSS-REFERENCE TO A RELATED APPLICATION

This application is a continuation of U.S. patent application Ser. No. 17/458,707, filed Aug. 27, 2021, which is incorporated herein by reference in its entirety.

BACKGROUND

A low-dropout regulator (LDO) is a DC linear voltage regulator that can regulate the output voltage even when the supply voltage is very close to the output voltage. Low dropout regulators may be advantageous over other DC to DC regulators based on their absence of switching noise, potential for smaller device sizes, and simplified overall designs.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
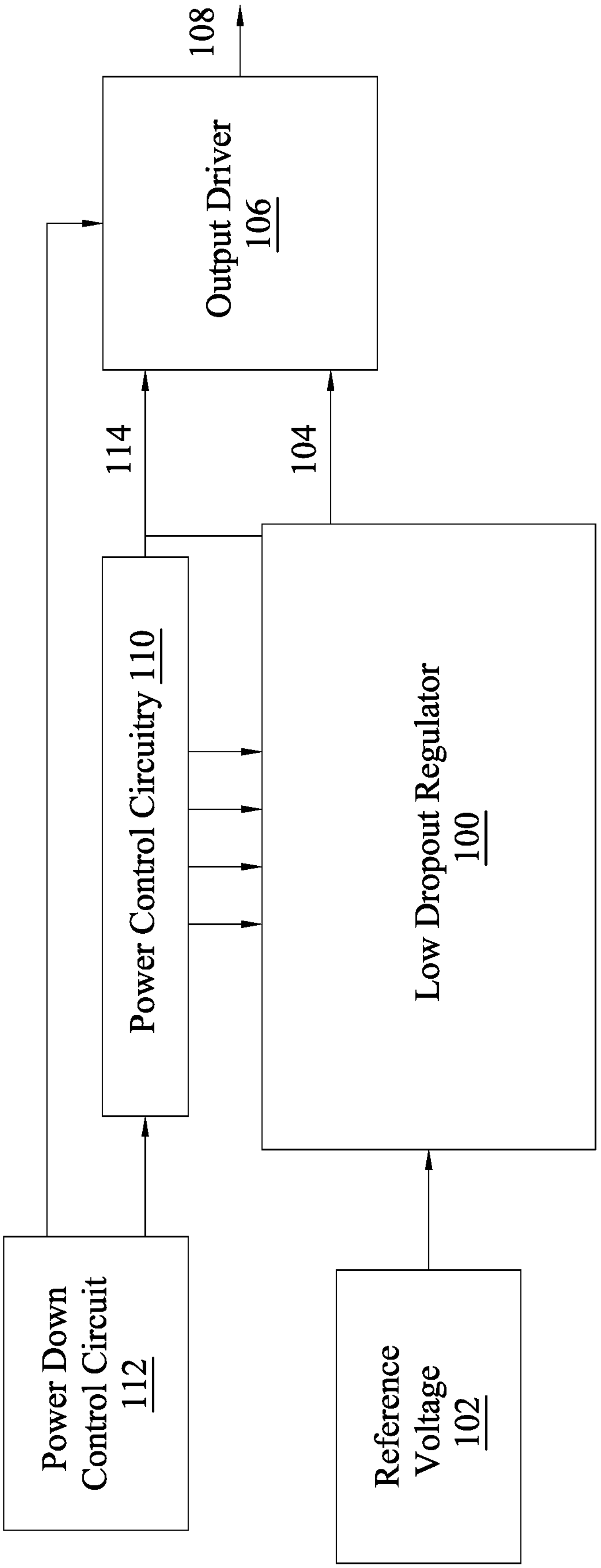
FIG. 1 is a diagram depicting an LDO circuit with power down control in accordance with embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some embodiments of the disclosure are described. Additional operations can be provided before, during, and/or after the stages described in these embodiments. Some of the stages that are described can be replaced or eliminated for different embodiments. Additional features can be added to the circuit. Some of the features described below can be replaced or eliminated for different embodiments. Although some embodiments are discussed with operations performed in a particular order, these operations may be performed in another logical order.

Voltage reference devices such as LDOs and bandgap voltage references are used in a wide variety of applications including integrated circuits to provide a stable, predictable desired voltage. It is thus sometimes desirable that LDOs and bandgap voltage references maintain a precise fixed voltage over a range of conditions such as temperature changes, power supply variations, and changes in circuit loading any devices being driven. As these voltage references are commonly used as power supplies for a wide variety of devices and integrated circuits, they are often implemented along with a circuit to conveniently and safely start up and power down. It is often desirable that any such circuitry maintains the as-designed fixed voltage of the voltage reference device it controls (e.g., ±0.1%, ±1.0%, ±5.0%) during start up and power down and can do so frequently with a high degree of reliability and durability.

Meeting these requirements can become a challenge, e.g., as the operating voltage of the circuit increases, such as at voltages around 1.2 volts and greater. When start-up and power-down circuitry for voltage regulators are implemented by electrically coupling the voltage regulator to a supply voltage and a ground directly by core-only power components at each junction, anomalous behavior may result. In certain implementations, each transistor’s gate is electrically coupled to a status voltage signal indicating whether the voltage regulator should be powered on or powered down, which thereby controls those transistors. The voltage regulator’s output is coupled to the supply voltage by an output driver transistor and to ground by a voltage divider. The voltage regulator is powered down by setting the status voltage signal to an appropriate voltage to turn the core-only power components on or off in such a way that it causes the output driver transistor to turn off, resulting in the voltage regulator’s output being pulled down to ground through the voltage divider while the status voltage signal remains in the power-down state. Conversely, the voltage regulator may be started up by setting the status voltage signal to an appropriate voltage to turn the core-only power components on or off so that the output driver transistor is turned on, allowing the voltage regulator to operate normally while the status voltage signal remains in the start-up state.

This “rail-to-rail” operation of the circuit may become problematic at higher voltages (e.g., of 1.2 volts or greater) because it results in a relatively large voltage drop over individual components. For example, an output driver transistor may at times subjected to a high voltage (e.g., the full 1.2 or more volts across it), such as when the circuit is in power-down mode and outputting 0 volts.

Subjecting components of the voltage regulator circuit to relatively high voltages can result in a variety of issues, including damage to power control and output driver circuitry. Systems and methods as described herein can mitigate certain of these issues, which include risk of dielectric breakdown of circuit components exposed to high voltages, resulting in unwanted breakdown and leakage current. Such behavior is particularly problematic when it affects an output value of the voltage regulation circuit, which is the circuit’s primary purpose.

Systems and methods as described herein can mitigate issues by controlling voltage drop across individual components of the circuit, resulting in limited leakage current, and consequently increasing the circuit’s reliability, performance and longevity by reducing voltage breakdown across individual components. In embodiments, the device of the present disclosure is implemented with smaller components, which can result in a desirably small footprint for the circuit.

In embodiments, systems and methods disclosed herein achieves some or all of these benefits by keeping gate-source and drain-source voltage differentials for all IO and output driving devices at a limited level (e.g., under 0.75 volts) throughout both power-down and normal modes of operation. Maintaining this relatively low voltage differential improves performance and reliability of the circuit and allows the circuit to be used to drive a wider variety of loads (e.g., analog loops such as PLL and ADCs that may provide sudden current draws from the LDO, which can result in large voltage differentials across certain LDO components if not properly protected).

FIG. 1 is a diagram depicting an LDO circuit with power down control in accordance with embodiments. An LDO 100 receives a reference voltage 102 and provides an output signal 104 to an output driver 106 which provides a substantially constant output voltage at node 108 for powering other downstream circuitry. The LDO 100 is responsive to power control circuitry 110 that provides power and ground signals to the LDO 100 to control normal and power down state operations. In embodiments, those power and ground signals are controlled via transistors whose gates are controlled by transistors as commanded by signals from a power down control circuit 112, as discussed further herein. The power down control circuit 112 further provides control signals to the output driver circuitry 106, which in combination with the LDO 100 output signal 104 and a combined signal 114 from LDO 100 and power control circuitry 110 provide the output signal at node 108 while protecting system circuitry.

Figure 2B:
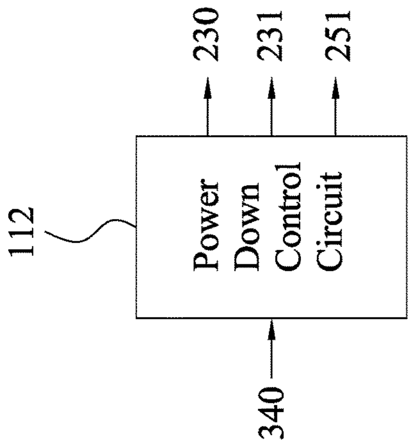
FIG. 2*b* depicts a block diagram of a power-down control circuit for starting up and powering down an LDO circuit configured for high voltage applications and defining the LDO circuit's output in accordance with embodiments.
Figure 2A:
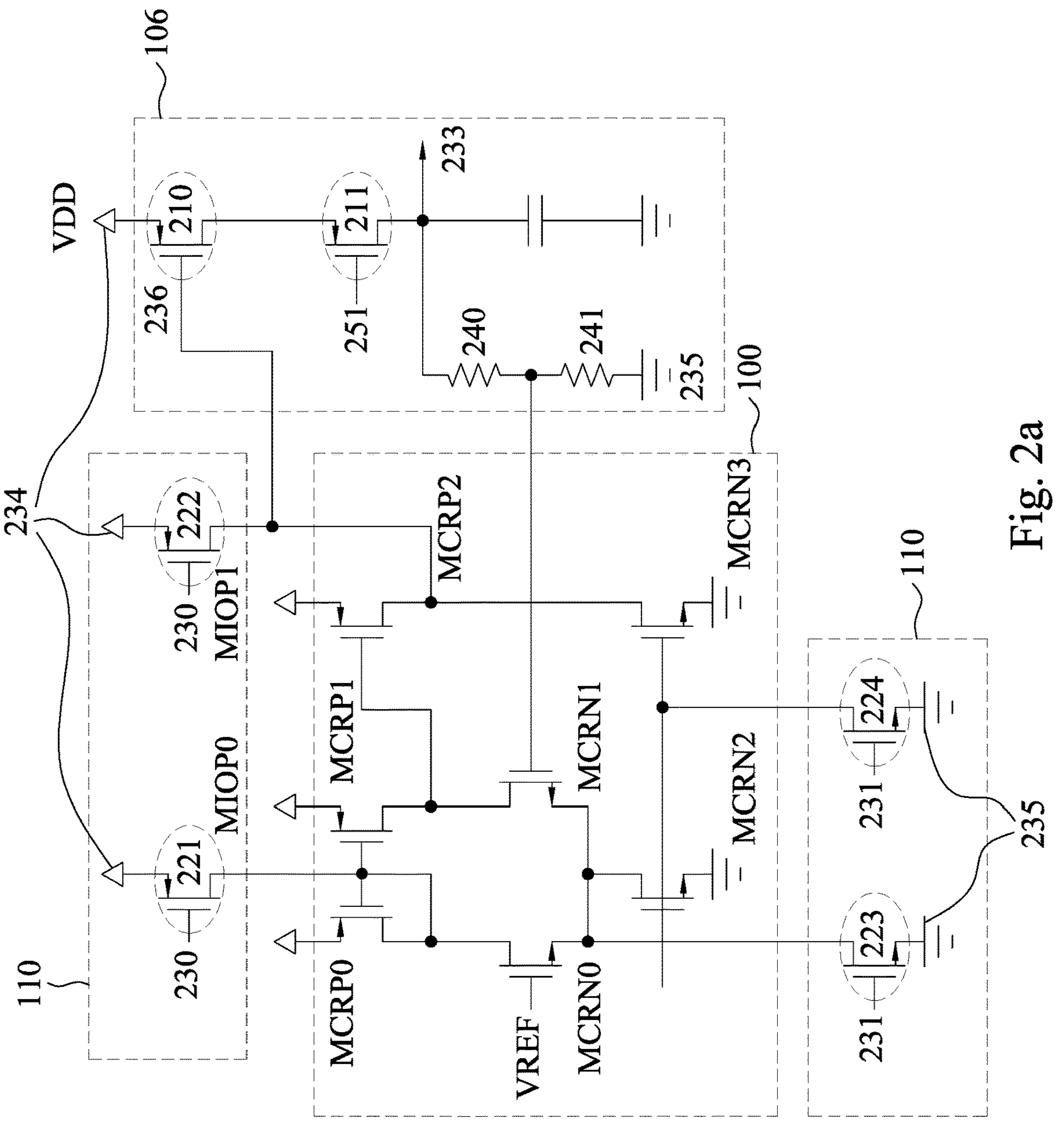
FIG. 2*a* depicts a schematic diagram of an LDO circuit configured for high voltage applications with controllable core-only power components for starting up and powering down the circuit and configurable output driver components for defining an output and protecting the circuit in accordance with embodiments.

FIG. 2*a* is a schematic diagram of an LDO circuit 100. A power down control circuit 112 in accordance with embodiments is depicted in FIG. 2*b*. The LDO 100 is responsive to power control circuitry 110 that places the LDO 100 in a power state on command (e.g., based on a power down (PD) signal 340). Power control circuitry 110 includes transistors 221, 222, 223 and 224 that are configured for starting up and powering down the LDO circuit 100. Output driver 106 includes an output driver transistor 210 that in the FIG. 2*a* embodiment takes the form of a PMOS transistor. Output driver transistor 210 has a source terminal electrically coupled to a supply voltage 234, a gate terminal connected to an output 236 of LDO 100 and power control circuitry 110, and a drain terminal electrically coupled to a source terminal of PMOS output transistor 211. The output transistor 211 has a gate terminal receiving a constant voltage output tuning signal 251 (PDG), which is generated by the power down control circuit 112, as described further herein. Finally, the output transistor 211 has a drain terminal electrically coupled to output node 233, which is in turn also electrically coupled to electrical ground 235 through resistors 240 and 241 in series in one branch and a capacitor in a second branch.

The power down control circuit 112 is configured to provide output transistor 211 a constant voltage PDG 251 at all times while the circuit is active. PDG 251 is set to a predetermined value (for example, 0.5 volts) such that output transistor 211 acts as a MOS resistor to provide a desired output voltage level 233 by acting as a voltage divider with resistors 240 and 241. Thus, when the circuit is operating in an active mode, it will provide an output voltage 233 proportional to the sum resistance of resistors 240 and 241 divided by the total sum resistance of output transistor 211 and resistors 240 and 241. The utilization of output transistor 211, which acts as a voltage tunable resistor, in series between output driver 210 and output 233, reduces the voltage drop experienced by output driver transistor 210 by the amount of the voltage drop experienced across output transistor 211. As noted above, reducing voltage drop across power control circuitry 110 and the output driver 106 is an example benefit provided in embodiments herein. Such a reduction in such voltage drops across these components increases reliability, performance, and longevity of the device by ultimately reducing leakage current across the components. Additionally, this reduction in voltage difference across the output driver transistor 210 allows the output driver transistor 210 to potentially be implemented with a smaller sized transistor component. Finally, the use of output transistor 211 as a voltage tunable resistor allows output voltage 233 to be easily configured by modifying the output tuning signal PDG 251, which is output by the power down control circuit 112.

A top portion of power control circuitry 110 includes transistors 221 and 222 are also represented in FIG. 2*a* by PMOS transistors with source terminals electrically coupled to the supply voltage 234 and gate terminals electrically coupled to an inverse status voltage signal 230 (PDPB) received from the power down control circuit 112. A drain terminal of power control circuitry transistor 222 is electrically coupled to a gate terminal of output driver transistor 210 and as an input to LDO 100. A drain terminal of power control circuitry transistor 221 also serves as an input to LDO 100.

The bottom portion of power control circuitry 110 includes transistors 223 and 224 that are implemented with NMOS transistors. Each of power control circuitry transistors 223 and 224 has a drain terminal electrically coupled to signals from LDO 100 and each has a gate terminal electrically coupled to a status voltage signal 231 (PDNB) received from the power down control circuit 112. Each power control circuitry transistor 223 and 224 has a source terminal electrically coupled to electrical ground 235.

When inverse status voltage signal 230 (PDPB) is set to a high voltage level (e.g., near the supply voltage 234), the circuit is set to a "normal operation mode," in which power control circuitry transistors 221 and 222 are turned off. During that time, the status voltage signal 231 (PDNB) is set to its low value of 0 volts. This turns off power control circuitry devices 223 and 224. With all power control circuitry devices 221, 222, 223 and 224 turned off in normal operation mode, the LDO 100 operates normally without interference.

In normal operation mode, the output 236 of LDO 100 controls the gate of output transistor 210. When output driver 210 is turned on, its drain terminal functions provides current to the output 233 of the circuit via output transistor 211, which functions as a tunable resistor as commanded by PDG 251. While output driver 210 is turned on, current flows from the supply voltage 234 through output driver 210 and output transistor 211 and then over resistors 240 and 241 to electrical ground 235, where resistors 240 and 241 pull up the voltage of output 233.

When in a normal operating mode, such that transistor 222 has no impact on node 236, and when the output 236 of LDO 100 is a low voltage, it turns the output driver 210 on, allowing current to flow from the supply voltage 234, through output driver transistor 210, through output transistor 211, and through resistors 240 and 241 to ground. When this occurs, the output 233 is equal to the output driver's current multiplied by the ratio of the sum of the resistance of resistors 240 and 241 divided by the total sum of the resistance of the output transistor 211 and resistors 240 and 241.

When the power down control circuit 112 sets the status voltage signal 231 (PDNB) to its high value (e.g., 0.75 volts) and inverse status voltage signal 230 (PDPB) is consequently set to its low value (e.g., 0.75 volts), all four of the power control circuitry devices 221, 222, 223 and 224 are turned on. This has the effect of putting the circuit in "power-down mode." Most significantly, the power control circuitry transistor 222 supplies the gate of output transistor 210 with a high voltage at LDO output 236. When output driver transistor 210 is supplied with a high voltage to its gate terminal, it turns off, disconnecting the supply voltage 234 from supplying voltage and current through output transistor 211 and resistors 240 and 241 to electrical ground 235. Thus, output 233 is pulled to 0 volts through resistors 240 and 241 to electrical ground 235. Additionally, power control circuitry transistors 223 and 224 are turned on by receiving the 0.75 volt status voltage signal 231 to their gate terminals, draining charge from LDO 100 to ground 235.

Thus, the circuit achieves power-down mode with its output 233 set to 0 volts and charge drained from the LDO 100.

Figure 3B:
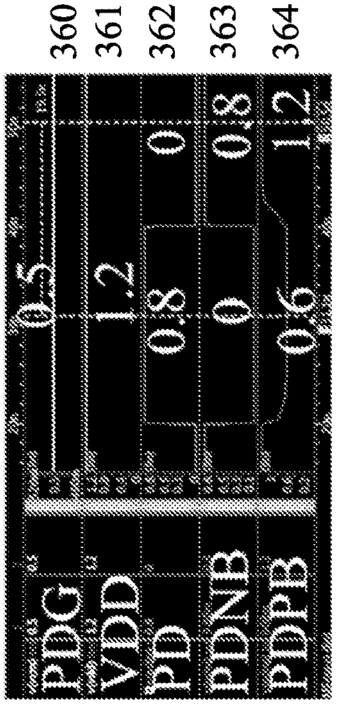
FIG. 3*b* depicts a timing diagram consisting of example inputs and corresponding outputs for an example configuration of a power-down control circuit in accordance with embodiments.
Figure 3A:
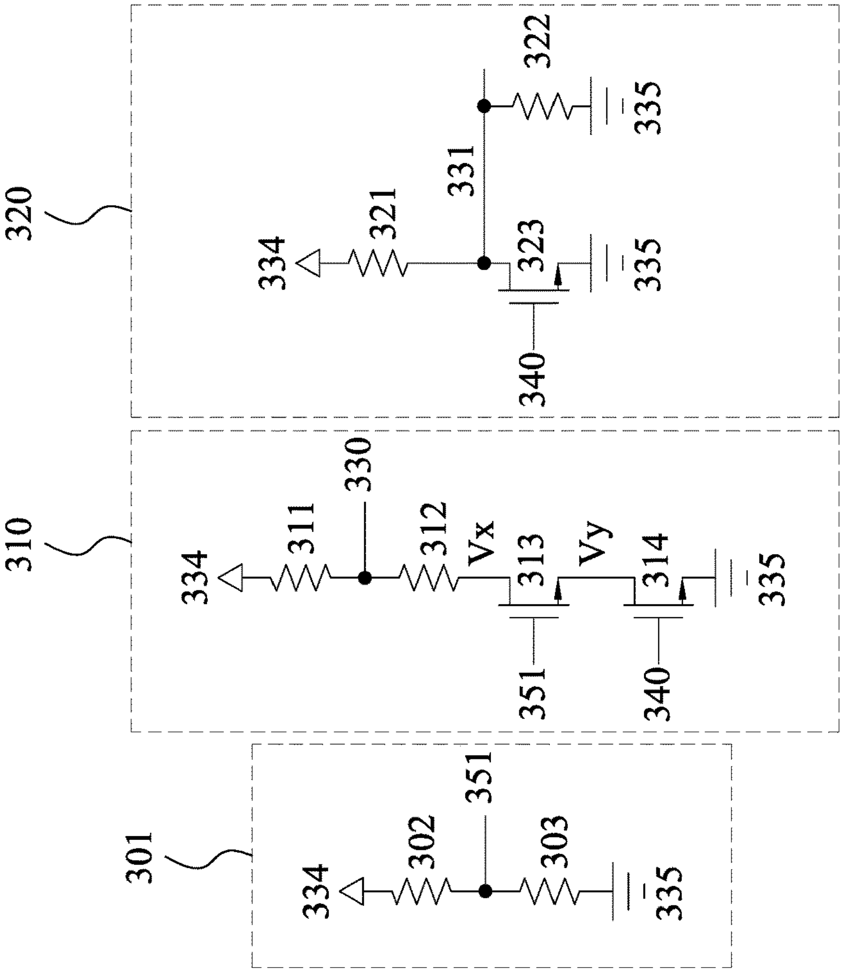
FIG. 3*a* depicts a schematic diagram of a power-down control circuit for starting up and powering down an LDO circuit configured for high voltage applications and defining the LDO circuit's output in accordance with embodiments.

FIG. 3*a* depicts an example implementation of power down control circuit 112 for generating control signals comprising an inverse status voltage signal 330 (PDPB), a status voltage signal 331 (PDNB), and an output tuning signal 351 (PDG), in accordance with an embodiment. The output tuning signal 351 is generated by a voltage divider circuit 301. The output tuning signal 351 is electrically coupled to a supply voltage 334 through a first resistor 302 and electrically coupled to electronic ground 335 through a second resistor 303. A value for the output tuning signal 351 can be controlled by selection of resistors 302 and 303. The value of the output tuning signal 351 is equivalent to the value of the supply voltage 334 multiplied by the ratio of the resistance of resistor 303 to the total resistance of both resistors 302 and 303 combined.

The inverse status voltage signal 330 is generated by a circuit 310. The inverse status voltage signal 330 is electrically coupled to the supply voltage 334 through a first resistor 311. The inverse status voltage signal 330 is also electrically coupled to a drain of a first NMOS transistor 313 through a second resistor 312. The output tuning signal 351 is electrically coupled to the a gate terminal of the first NMOS transistor 313 and a source terminal of the first NMOS transistor 313 is electrically coupled to a drain of a second NMOS transistor 314. The second NMOS transistor 314 has a source terminal electrically coupled to electronic ground 335 and a gate terminal electronically coupled to a power-down input signal 340. Of note, when a power down command is received by the power down control circuit 112 (i.e., PD goes high), transistor 314 turns on and pulls the inverse status voltage signal 330 (PDPB) down from the supply voltage 334, as depicted in FIG. 3*b*.

The status voltage signal 331 is generated by a circuit 320. The status voltage signal 331 is electrically coupled to the supply voltage 334 through a first resistor 321. The status voltage signal 331 is also electrically coupled to electronic ground 335 through a second resistor 322 in parallel with an NMOS transistor 323, which has a source terminal electrically coupled with electronic ground and a drain terminal electronically coupled with the status voltage signal 331. The NMOS transistor 323 is controlled by the power-down input signal 340.

FIG. 3*b*. illustrates a sample timing diagram for a number of outputs of a control block in relation to a power-down input signal 362 in accordance with embodiments. The diagram depicts, in volts, the values for an output tuning signal 360, a supply voltage 361, a status voltage signal 363, and an inverse status voltage signal 364 in relation to a given value of power-down input signal 362.

Figure 4:
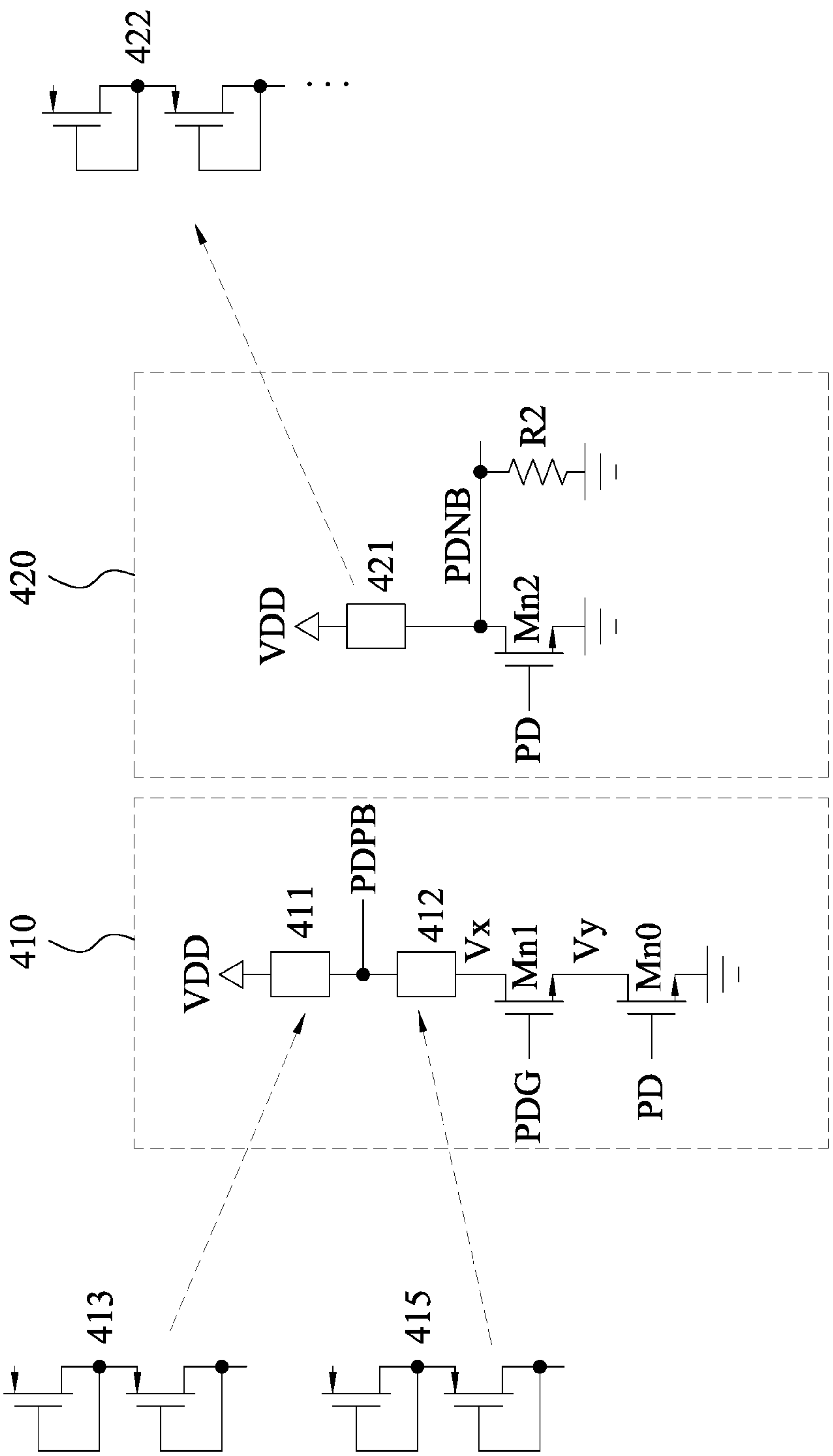
FIG. 4 depicts an example schematic diagram of a power-down control circuit in which a number of resistor components are replaced with MOS diodes in accordance with embodiments.

FIG. 4 illustrates that the power down control circuit in FIG. 3 may alternatively be implemented utilizing MOS diodes as the depicted resistors for more efficient layout and fabrication in accordance with embodiments. A circuit 410 in FIG. 4 corresponds to the circuit 310 in FIG. 3*a* and a circuit 420 corresponds to a circuit 320 in FIG. 3*a*. The circuit 410 demonstrates that the circuit 310 may be implemented by utilizing MOS diodes 413 and 415 for resistive components 411 and 412, which correspond to resistors 311 and 312 in FIG. 3*a* rather than resistors for a more compact circuit and more efficient manufacturing. Similarly, the circuit 420 demonstrates that the circuit 320 may be implemented by utilizing MOS diodes 422 for resistive component 421, which corresponds to resistor 321 in FIG. 3*a*. Resistance may be set to a specified level by incorporating a larger number of diodes in each component the more resistance is desired.

Figure 5:
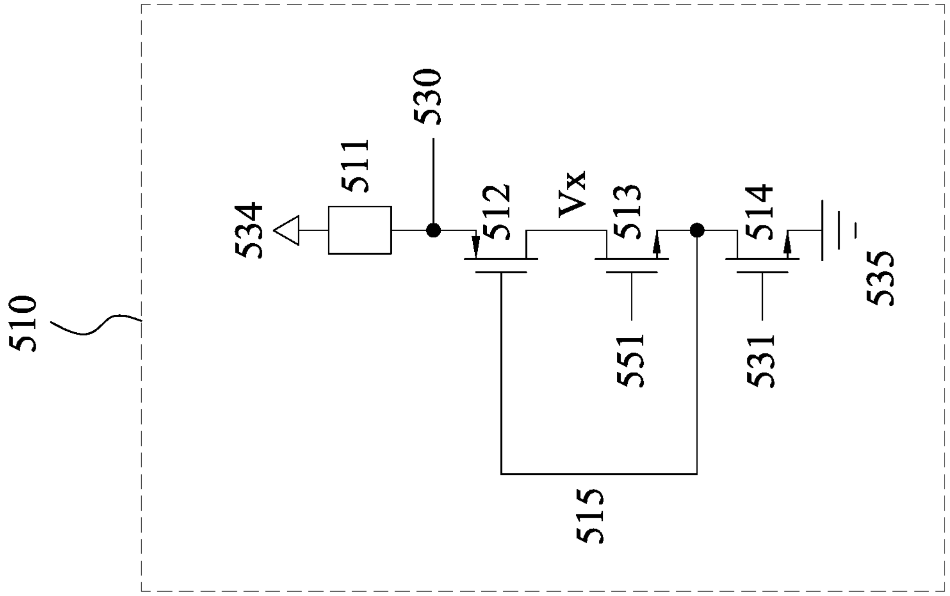
FIG. 5 depicts an example schematic diagram of an alternative power-down control circuit for generating an inverse status voltage signal with a tunable voltage level defined by a transistor's threshold voltage in accordance with embodiments.

FIG. 5 depicts an example schematic diagram of an alternative power-down control circuit 510 for generating an inverse status voltage signal 530 with a tunable voltage level defined by a threshold voltage of a tuning transistor 512 in accordance with embodiments. A supply voltage 534 is electrically coupled to a supply terminal of the tuning transistor 512 through a passive resistor element 511. A drain terminal of the tuning transistor 512 is electrically coupled to a drain terminal of a first transistor 513, which has a gate terminal electrically coupled to an output tuning signal 551 and a drain terminal electrically coupled to a drain terminal of a second transistor 514. The second transistor 514 has a source terminal electrically coupled to a ground 535 and a gate terminal electrically coupled to a power down signal 531. The tuning transistor 512 has a gate terminal 515 electrically coupled to the source terminal of the first transistor 513 and the drain terminal of the second transistor 514.

While the power down signal 531 is low, the second transistor 514 is off, resulting in the gate terminal 515 of the tuning transistor 512 having a high voltage, which results in the tuning transistor 512 being turned off. While the tuning transistor 512 is off, the inverse status voltage signal 530 outputs a voltage equivalent to the supply voltage 534. Of note, the passive resistor element 511 is implemented as a passive resistor to pull the voltage of the inverse status voltage signal 530 up to the supply voltage 534 while the tuning transistor 512 is turned off. When the power down signal 531 goes high, the second transistor 514 is turned on, which pulls down the gate terminal 515 of the tuning transistor 512. When the tuning transistor 512 is turned on, current flows through the power-down control circuit 510 from the source voltage 534 to the drain 535, which pulls down the inverse status voltage signal 530 to its low voltage state. The voltage value of the low voltage state of the inverse status voltage signal 530 is defined by the threshold voltage of tuning transistor 512.

Figure 6:
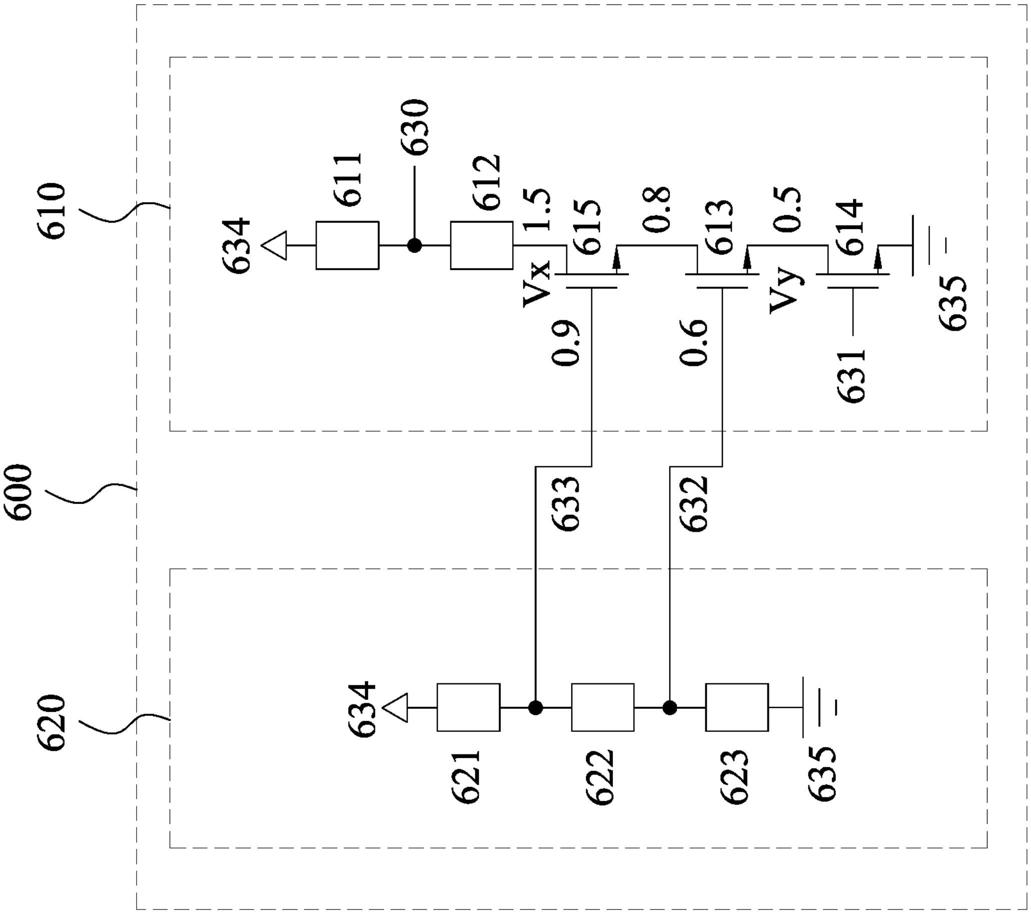
FIG. 6 depicts an example schematic diagram of an alternative power-down control circuit for generating an inverse status voltage signal with additional voltage protection for high voltage application in accordance with embodiments.
Figure 7C:
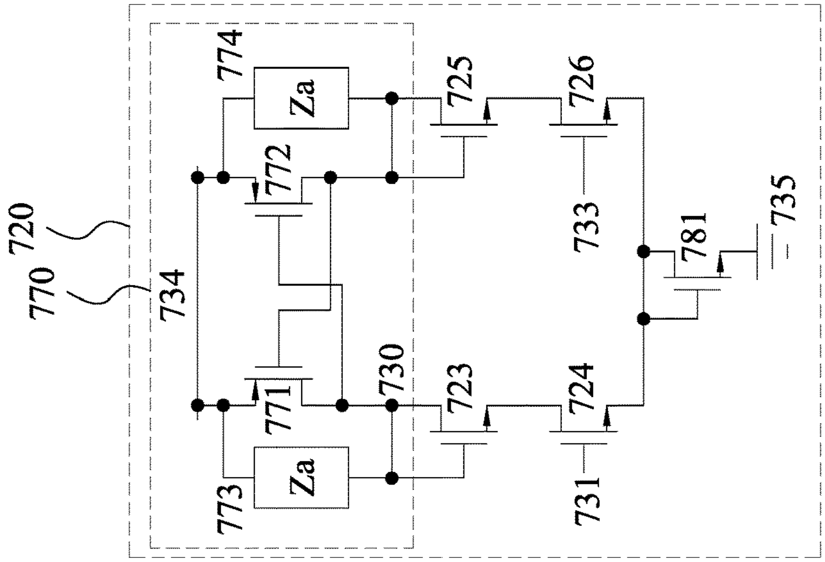
FIG. 7*c* depicts an example schematic diagram of an alternative power-down control circuit for generating an inverse status voltage in a very low current configuration without a voltage output tuning signal in accordance with embodiments.
Figure 7B:
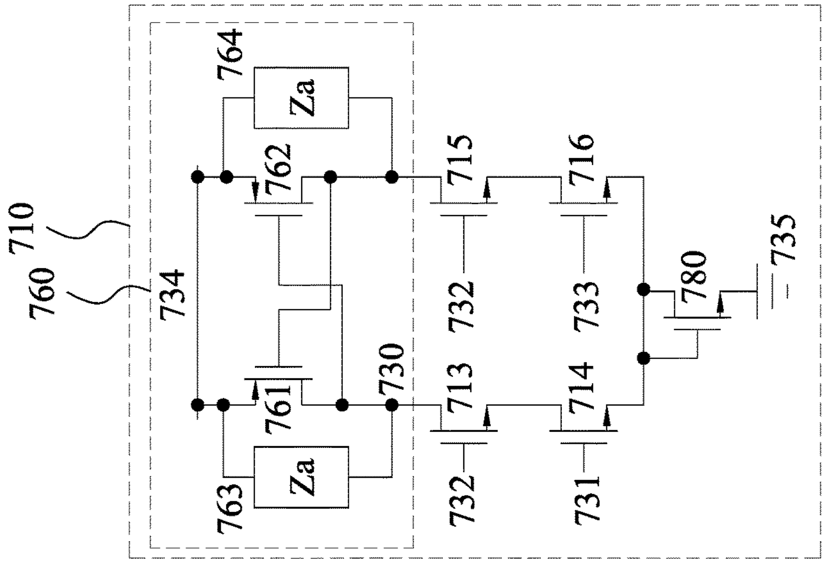
FIG. 7*b* depicts an example schematic diagram of an alternative power-down control circuit for generating an inverse status voltage in a very low current configuration in accordance with embodiments.
Figure 7A:
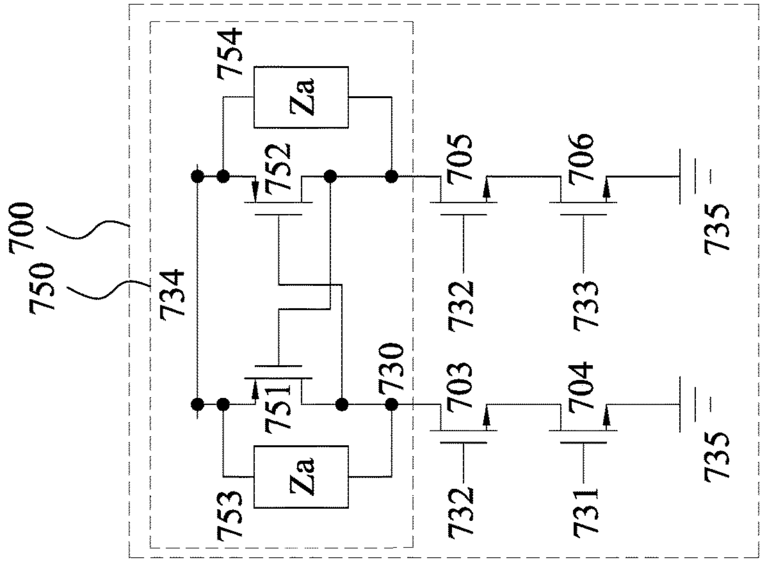
FIG. 7*a* depicts an example schematic diagram of an alternative power-down control circuit for generating an inverse status voltage in a low current configuration in accordance with embodiments.

FIG. 6 depicts an example schematic diagram of an alternative power-down control circuit 600 for generating an inverse status voltage signal 630 with additional voltage protection for high voltage application in accordance with embodiments. The inverse status voltage signal 630 is electrically coupled to a supply voltage 634 through a first resistive element 611. The inverse status voltage signal 630 is also electrically coupled to a second resistive element 612, which is electrically coupled to a drain terminal of a breakdown protection NMOS transistor 615. A source terminal of the breakdown protection NMOS transistor 615 is electrically coupled to a drain terminal of a first NMOS transistor 613. The first NMOS transistor 613 has a source terminal electrically coupled to a drain terminal of a second NMOS transistor 614, which has a source terminal electrically coupled to an electronic ground 635.

The breakdown protection NMOS transistor 615 and the first NMOS transistor 613 are each controlled by a gate voltage 633 and 632, respectively, which are generated by a voltage divider 620. The voltage divider 620 comprises the supply voltage 634 electrically coupled to the gate voltage 633 of the breakdown protection NMOS transistor 615 through a first resistive element 621. The gate voltage 633 of the breakdown protection NMOS transistor 615 is electrically coupled to the gate voltage 632 of the first NMOS transistor 613 through a second resistive element 622. The gate voltage 632 is electrically coupled to electrical ground 635 through a third resistive element 623.

The resistive elements 621, 622, and 623 of the voltage divider 620 may be selected to provide desired gate voltages 633 and 632. The gate voltage 632 for the first NMOS transistor is determined by the following equation: V 632=(VDD 634−GND 635)/(R 621+R 622+R 623)×R 623, and the gate voltage 633 for the breakdown protection NMOS transistor 615 is determined by the following equation: V 633=(VDD 634−GND 635)/(R 621+R 622+R 623)×(R 623+R 622), wherein V 632 and V 633 represent voltage values of the gate voltages 632 and 633 respectively, and R 621, R 622, and R 623 represent the resistance values of resistive elements 621, 622, and 623 respectively.

In some embodiments, the inclusion of the breakdown protection NMOS transistor 615 reduces the occurrence and magnitude of breakdown current in power-down control circuit 610 by reducing voltage drop across the first NMOS transistor 613 and the second NMOS transistor 614.

FIG. **7*a* depicts an example schematic diagram of an alternative power-down control circuit 700 for generating an inverse status voltage signal 730 in a low current configuration in accordance with embodiments. The power-down control circuit 700 comprises a cross-coupled latch 750 comprising a first cross-coupled latch transistor 751 and a second cross-coupled latch transistor 752, as well as resistive loads 753 and 754. In some embodiments, resistive loads 753 and 754** may be implemented by a resistor or a diode-connected MOSFET.

A source terminal of each cross-coupled latch transistor 751 and 752 is electrically coupled to a source voltage 734. The source voltage 734 is also electrically coupled to a drain terminal of cross-coupled latch transistor 751 through resistive element 753 and to a drain terminal of cross-coupled latch transistor 752 through resistive element 754. A gate terminal of cross-coupled latch transistor 751 is electrically coupled to the drain terminal of cross-coupled latch transistor 752. A gate terminal of cross-coupled latch transistor 752 is similarly electrically coupled to the drain terminal of cross-coupled latch transistor 751. The drain terminal of cross-coupled latch transistor 751 is electrically coupled to the inverse status voltage 730.

The drain terminal of cross-coupled latch transistor 751 is electrically coupled to a drain terminal of a first NMOS transistor 703. The first NMOS transistor 703 has a source terminal connected to electrical ground 735 through a second NMOS transistor 704. The first NMOS transistor 703 has a gate terminal connected to an output tuning signal 732. The second NMOS transistor 704 has a gate terminal electrically coupled to a power-down input signal 731.

Similarly, the drain terminal of cross-coupled latch transistor 752 is electrically coupled to a drain terminal of a third NMOS transistor 705. The third NMOS transistor 705 has a source terminal connected to electrical ground 735 through a fourth NMOS transistor 706. The third NMOS transistor 705 has a gate terminal connected to an output tuning signal 732. The fourth NMOS transistor 706 has a gate terminal electrically coupled to an inverse power-down input signal 733.

FIG. **7*b* depicts an example schematic diagram of an alternative power-down control circuit 710 for generating an inverse status voltage 730 in a very low current configuration in accordance with embodiments. The power-down control circuit 710 comprises a cross-coupled latch 760 comprising a first cross-coupled latch transistor 761 and a second cross-coupled latch transistor 762, as well as resistive loads 763 and 764. In some embodiments, resistive loads 763 and 764** may be implemented by a resistor or a diode-connected MOSFET.

A source terminal of each cross-coupled latch transistor 761 and 762 is electrically coupled to a source voltage 734. The source voltage 734 is also electrically coupled to a drain terminal of cross-coupled latch transistor 761 through resistive element 763 and to a drain terminal of cross-coupled latch transistor 762 through resistive element 764. A gate terminal of cross-coupled latch transistor 761 is electrically coupled to the drain terminal of cross-coupled latch transistor 762. A gate terminal of cross-coupled latch transistor 762 is similarly electrically coupled to the drain terminal of cross-coupled latch transistor 761. The drain terminal of cross-coupled latch transistor 761 is electrically coupled to the inverse status voltage 730.

The drain terminal of cross-coupled latch transistor 761 is electrically coupled to a drain terminal of a first NMOS transistor 713. The first NMOS transistor 713 has a source terminal electrically coupled to a drain terminal of a second NMOS transistor 714. The first NMOS transistor 713 has a gate terminal electrically coupled to an output tuning signal 732. The second NMOS transistor has a gate terminal electrically coupled to a power-down input signal 731 and a source terminal electrically coupled to both a gate and a drain terminal of a grounding NMOS transistor 780, which has a source terminal electrically coupled to the electrical ground 735.

Similarly, the drain terminal of cross-coupled latch transistor 762 is electrically coupled to a drain terminal of a third NMOS transistor 715. The third NMOS transistor 715 has a source terminal electrically coupled to a drain terminal of a fourth NMOS transistor 716. The third NMOS transistor 715 has a gate terminal electrically coupled to an output tuning signal 732. The fourth NMOS transistor has a gate terminal electrically coupled to an inverse power-down input signal 733 and a source terminal electrically coupled to both a gate and a drain terminal of the grounding NMOS transistor 780.

FIG. **7*c* depicts an example schematic diagram of an alternative power-down control circuit 720 for generating an inverse status voltage 730 in a very low current configuration without a voltage output tuning signal 732 in accordance with embodiments. The power-down control circuit 720 comprises a cross-coupled latch 770 comprising a first cross-coupled latch transistor 771 and a second cross-coupled latch transistor 772, as well as resistive loads 773 and 774. In some embodiments, resistive loads 773 and 774** may be implemented by a resistor or a diode-connected MOSFET.

A source terminal of each cross-coupled latch transistor 771 and 772 is electrically coupled to a source voltage 734. The source voltage 734 is also electrically coupled to a drain terminal of cross-coupled latch transistor 771 through resistive element 773 and to a drain terminal of cross-coupled latch transistor 762 through resistive element 774. A gate terminal of cross-coupled latch transistor 771 is electrically coupled to the drain terminal of cross-coupled latch transistor 772. A gate terminal of cross-coupled latch transistor 772 is similarly electrically coupled to the drain terminal of cross-coupled latch transistor 771. The drain terminal of cross-coupled latch transistor 771 is electrically coupled to the inverse status voltage 730.

The drain terminal of cross-coupled latch transistor 771 is electrically coupled to a drain terminal of a first NMOS transistor 723. The first NMOS transistor 723 has a source terminal electrically coupled to a drain terminal of a second NMOS transistor 724. The first NMOS transistor 723 has a gate terminal electrically coupled to the drain terminal of the first cross-coupled latch transistor 771. The second NMOS transistor has a gate terminal electrically coupled to a power-down input signal 731 and a source terminal electrically coupled to both a gate and a drain terminal of a grounding NMOS transistor 781, which has a source terminal electrically coupled to the electrical ground 735.

Similarly, the drain terminal of cross-coupled latch transistor 772 is electrically coupled to both a drain terminal and a gate terminal of a third NMOS transistor 725. The third NMOS transistor 725 has a source terminal electrically coupled to a drain terminal of a fourth NMOS transistor 726. The fourth NMOS transistor has a gate terminal electrically coupled to an inverse status voltage signal 733 and a source terminal electrically coupled to both a gate and a drain terminal of the grounding NMOS transistor 781.

Figure 8B:
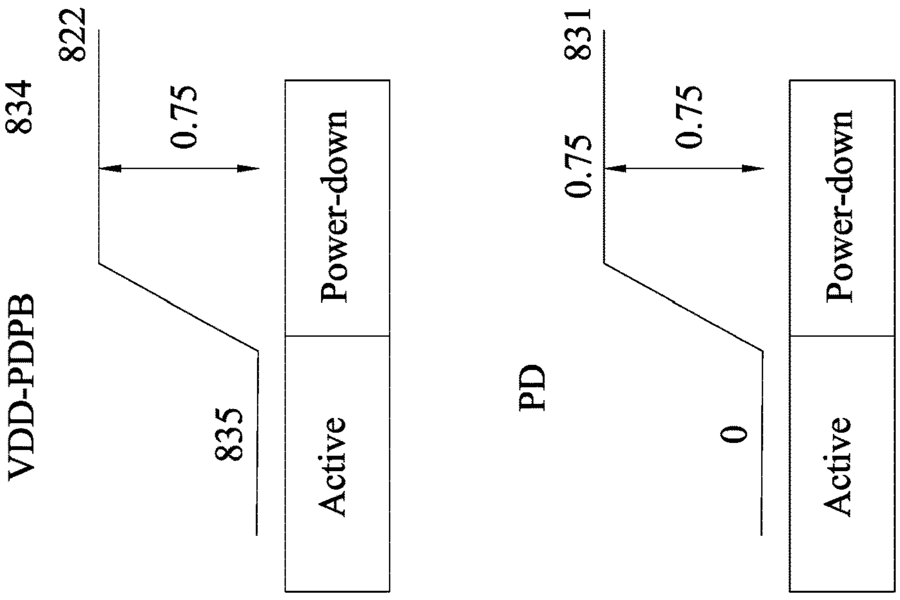
FIG. 8*b* depicts a timing diagram demonstrating an example voltage switching behavior of an inverse status voltage switching between active and power-down mode in response to a power down voltage signal switching between active and power down mode in a power-down control circuit for generating an inverse status voltage for fast response and low current leakage in accordance with embodiments.
Figure 8A:
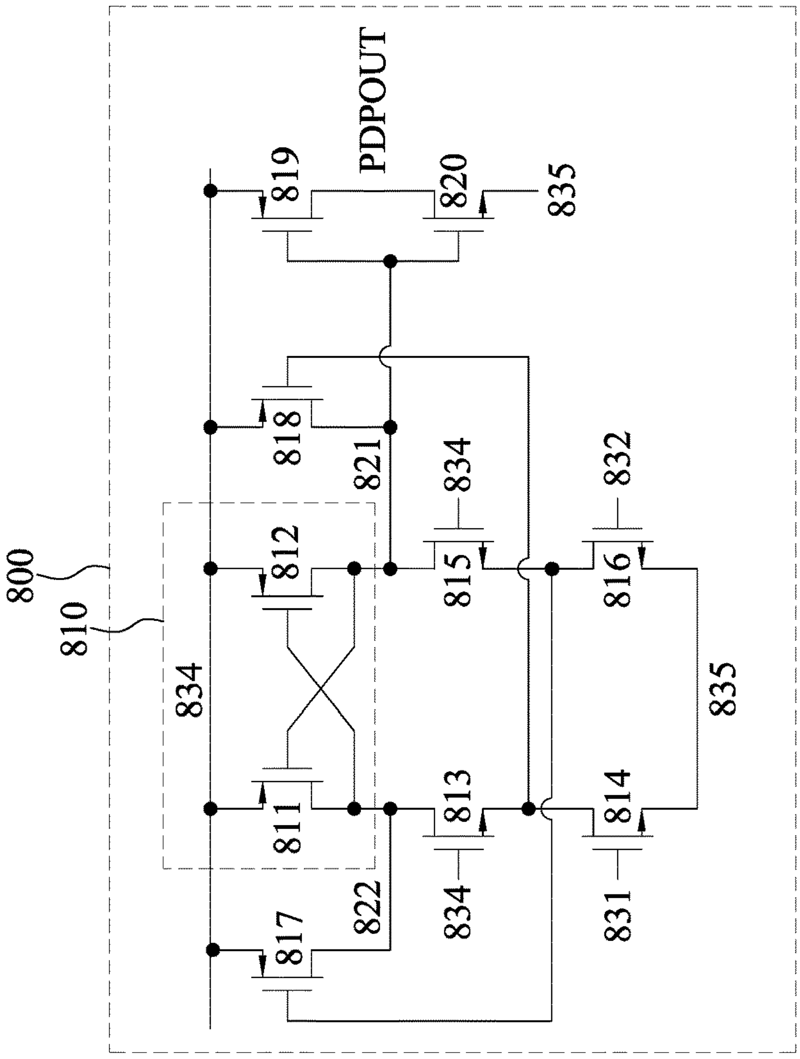
FIG. 8*a* depicts an example schematic diagram of an alternative power-down control circuit for generating an inverse status voltage for fast response and low current leakage in accordance with embodiments.

FIG. 8*a* depicts an example schematic diagram of an alternative power-down control circuit 800 for generating an inverse status voltage for fast response and low current leakage in accordance with embodiments. In some embodiments, an external power output can be supplied for a high-ground 835. In some embodiments, the high-ground 801 can be at mid-range voltages for the circuit (e.g., 0.45V). This reduces peak-to-peak voltage differences in the circuit to be within operating conditions for a core device (e.g., 0.75V) as opposed to a rail-to-rail voltage comprising a higher voltage difference between supply voltage and a ground of 0V.

In some embodiments, the power-down control circuit 800 comprises a cross-latch comprising a first cross-latch transistor 811 and a second cross-latch transistor 812. A source terminal of each cross-latch transistor 811 and 812 is electrically coupled to a supply voltage 834. A gate terminal of cross-latch transistor 811 is electrically coupled to a drain terminal of cross-latch transistor 812, and a gate terminal of cross-latch transistor 812 is electrically coupled to a drain terminal of cross-latch transistor 811.

The drain terminal of cross-latch transistor 811 is electrically coupled to a drain of a first buffer transistor 813, which has a gate voltage electrically coupled to the supply voltage 834. The buffer transistor 813 has a source terminal electrically coupled to a drain terminal of a grounding transistor 814, which has a source terminal electrically coupled to the high-ground 835 and a gate terminal electrically coupled to a power down input signal 831.

The drain terminal of cross-latch transistor 812 is electrically coupled to a drain of a first buffer transistor 815, which has a gate voltage electrically coupled to the supply voltage 834. The buffer transistor 815 has a source terminal electrically coupled to a drain terminal of a grounding transistor 816, which has a source terminal electrically coupled to the high-ground 835 and a gate terminal electrically coupled to an inverse power down input signal 832.

The source terminal of the buffer transistor 815 is electrically coupled to a gate terminal of an inverse status voltage signal driver transistor 817, which has a source terminal electrically coupled to the supply voltage 834 and a drain terminal electrically coupled to the drain terminal of the cross-latch transistor 811.

The source terminal of the buffer transistor 813 is electrically coupled to a gate terminal of a status voltage signal driver transistor 818, which has a source terminal electrically coupled to the supply voltage 834 and a drain terminal electrically coupled to the drain terminal of the cross-latch transistor 812.

The drain terminal of the cross-latch transistor 812 is electrically coupled to a gate of an output driver transistor 819 and a gate of an output high-grounding transistor 820. The output driver transistor 819 has a source terminal electrically coupled to the supply voltage 834 and a drain terminal electrically coupled to a drain terminal of the output high-grounding transistor 820. The output high-grounding transistor 820 has a source terminal electrically coupled to the high-ground 835.

During operation, when the power-down input signal 831 is set to high, it pulls the gate voltage of transistor 818 low, which turns transistor 818 on, pulling status voltage 821 high. In some embodiments, the buffer transistors 813 and 815 act as resistors, which ensure that transistors 817 and 818 are activated before the cross-latch transistors 811 and 812 are activated to allow for a fast response to changing input voltage from power-down input voltage signal 831.

FIG. 8*b* depicts a timing diagram demonstrating an example voltage switching behavior of an inverse status voltage signal 822 switching between active and power-down mode in response to a power-down voltage signal 831 switching between active and power down mode in a power-down control circuit 800 for generating an inverse status voltage for fast response and low current leakage in accordance with embodiments. The timing diagram in FIG. 8*b* demonstrates a near instantaneous correlation between the power-down voltage signal 831 switching from active to power-down mode and the inverse power-down voltage signal 822 switching from active mode to power-down mode. Of note, the inverse power-down signal 822 is set to the high-ground voltage 835 in active mode and switches to supply voltage 834 in power-down mode. This reduces the required voltage change required between modes and enables the fast response time of this circuit configuration.

Figures 9A, 9B, 9C:
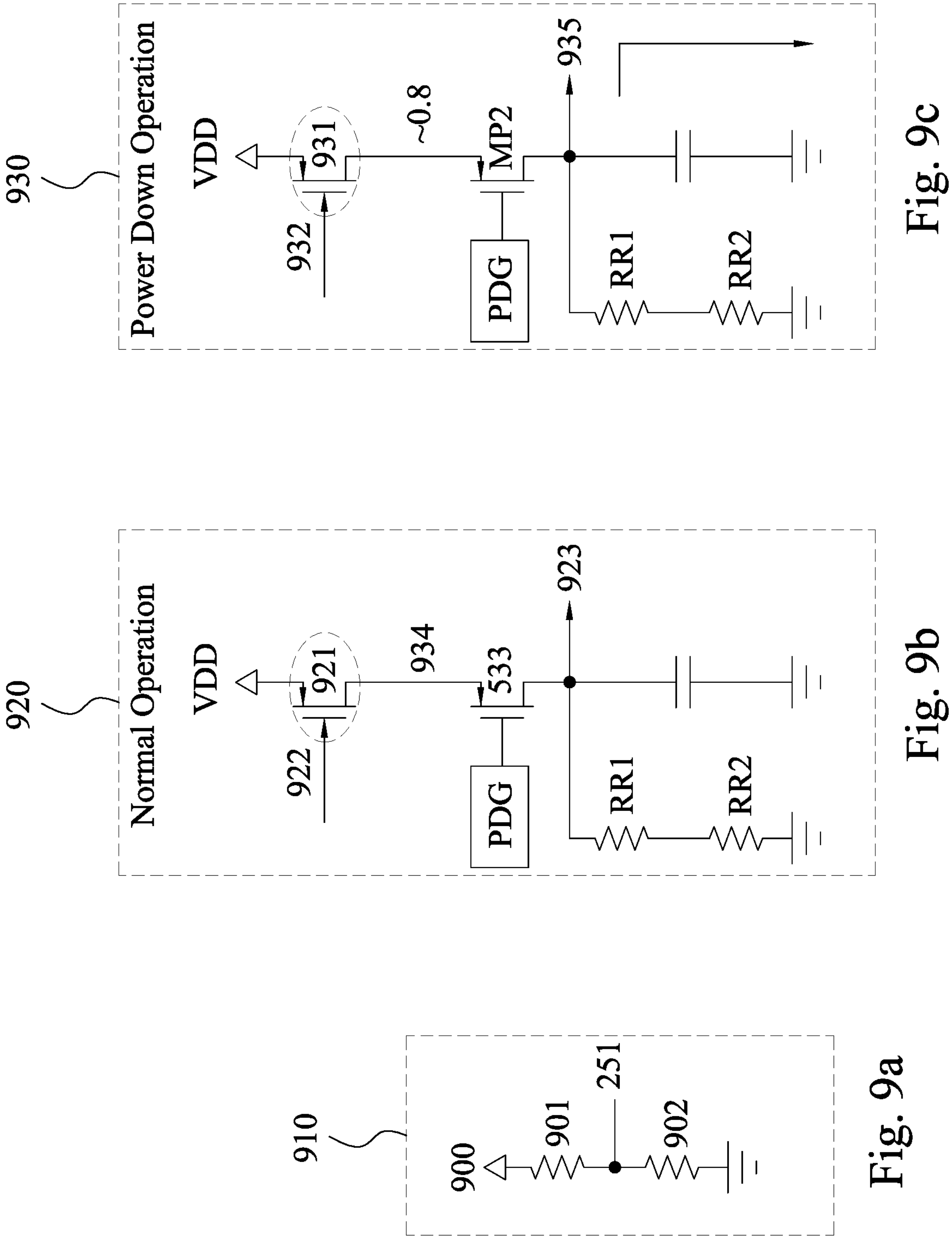
FIG. 9*a* depicts a schematic diagram of a portion of a power-down control circuit for configuring and generating a gate voltage of a transistor element of an output driver which defines an output of an LDO circuit in accordance with embodiments.
FIG. 9*b* depicts a schematic diagram of a power-down protection circuit for an output driver of an LDO circuit during normal operation in accordance with embodiments.
FIG. 9*c* depicts a schematic diagram of a power-down protection circuit for an output driver of an LDO circuit during power-down operation in accordance with embodiments.

FIG. 9*a* depicts a behavior of an output tuning voltage circuit 910, as it maintains a constant voltage at output 251 in all states of the overall circuit in accordance with embodiments. In circuit 910, a supply voltage 900 is electrically coupled to a first end of first resistive element 901. A second end of the first resistive element 901 is electrically coupled to a first end of a second resistive element 902. A second end of the second resistive element is electrically coupled to electrical ground 934. The output tuning voltage 251 is output at the junction of the second end of the first resistive element 901 and the first end of the second resistive element 902. The value of the output tuning voltage at output 251 can be determined by the equation: R 902×V 900 /(R 901+R 902), where V 910 is the supply voltage 910 of the circuit, R 901 is the resistance of a first resistive element of the circuit, and R 902 is the resistance of a second resistive element of the circuit 910.

FIG. 9*b*. depicts a diagram of an output behavior of an output driver circuit 920 under normal operation, in which an output driver component 921 is turned on by a low voltage at gate terminal 922 an output transistor 533 acts as a resistor, taking a portion 934 of voltage drop from the output driver component 921, and the circuit has a positive voltage output 923, which can power a load in accordance with embodiments.

FIG. 9*c*. depicts a diagram of an output behavior of an output driver circuit 920 under power-down operation, in which an output driver component 931 is turned off by a low voltage at gate terminal 932 and the voltage at the circuit's output 935 is pulled down to 0 volts, where it remains while in the power-down state in accordance with embodiments.

Figure 10B:
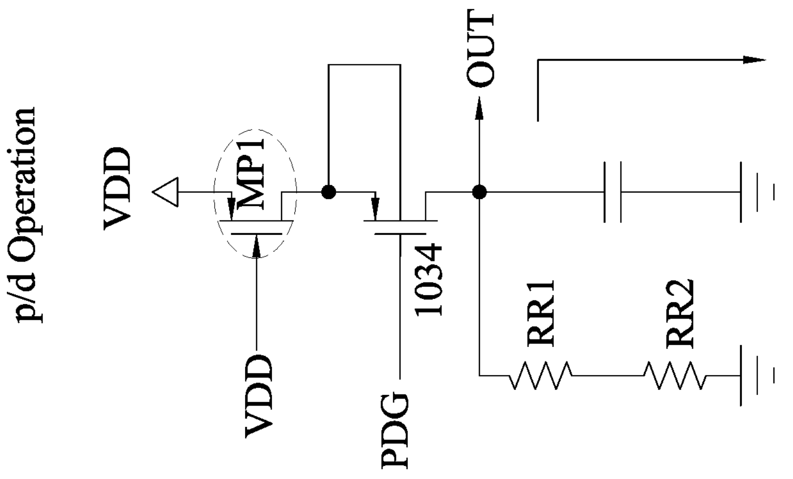
FIG. 10*b* depicts a schematic diagram of a power-down protection circuit for an output driver of an LDO circuit during power-down operation configured to reduce power-down leakage in accordance with embodiments.
Figure 10A:
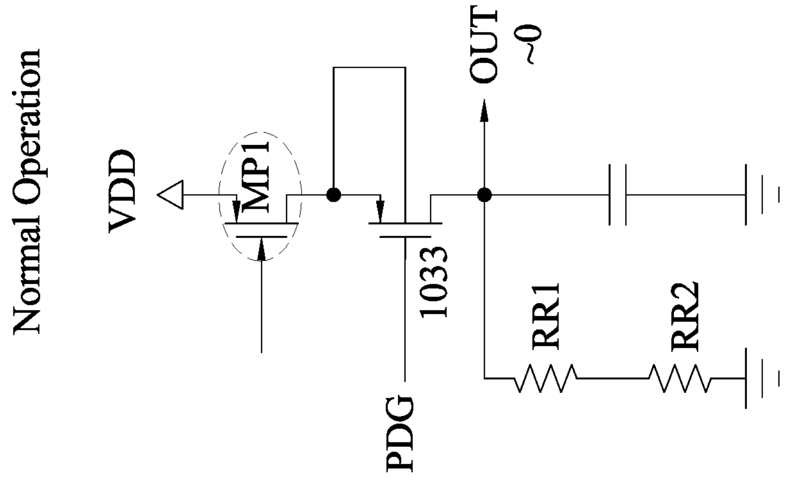
FIG. 10*a* depicts a schematic diagram of a power-down protection circuit for an output driver of an LDO circuit during normal operation configured to reduce power-down leakage in accordance with embodiments.

FIG. 10*a* depicts a schematic diagram of a power-down protection circuit for an output driver of an LDO circuit during normal operation configured to reduce power-down leakage in accordance with embodiments. In some embodiments, power-down leakage may be reduced by electrically coupling a gate terminal and a source terminal of output transistor 1033 in FIG. 10*a*, which comprises a circuit otherwise identical to the circuit shown in FIG. 9*b*. This ensures there will be no voltage difference between gate and source terminals of the output transistor 1033 in any circumstance, which reduces the possibility for undesired leakage current to flow through output transistor 1033 if its source terminal has an abnormal voltage during normal operation.

FIG. 10*b* depicts a schematic diagram of a power-down protection circuit for an output driver of an LDO circuit during power-down operation configured to reduce power-down leakage in accordance with embodiments. In some embodiments, power-down leakage may be reduced by electrically coupling a gate terminal and a source terminal of output transistor 1034 in FIG. 10*b*, which comprises a circuit otherwise identical to the circuit shown in FIG. 9*c*. This ensures there will be no voltage difference between gate and source terminals of the output transistor 1034 in any circumstance, which reduces the possibility for undesired leakage current to flow through output transistor 1034 if its source terminal has an abnormal voltage during power-down operation.

Figure 11B:
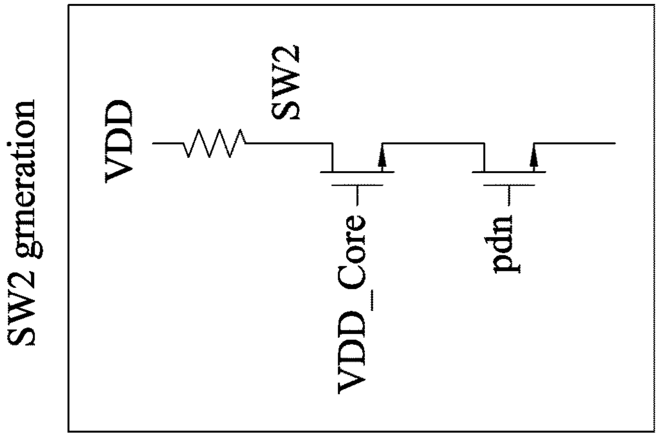
FIG. 11*b* depicts a schematic diagram of a power down control circuit in accordance with embodiments.
Figure 11A:
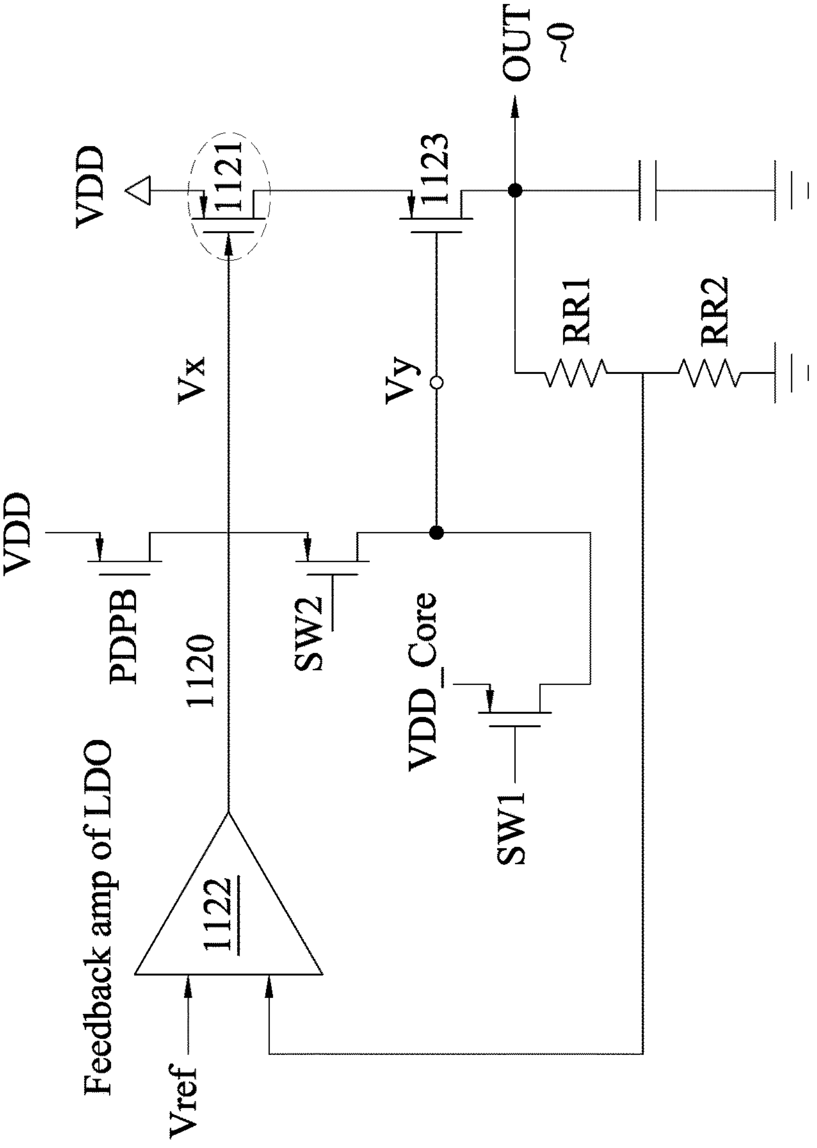
FIG. 11*a* depicts a schematic diagram of a power-down protection circuit for an output driver of an LDO circuit electrically coupled to a feedback amplifier of an LDO, which controls the output driver transistor of the output driver in accordance with embodiments.

FIG. 11*a* depicts a schematic diagram of a power-down protection circuit for an output driver of an LDO circuit electrically coupled to a feedback amplifier 1122 of an LDO, which controls the output driver transistor 1121 of the output driver in accordance with embodiments. In some embodiments, an output driver transistor 1121 may be controlled by an output signal 1120 from an LDO feedback amplifier 1122. An output transistor 1123 may be controlled independently from the output driver transistor 1121 to provide better power-down protection. In some embodiments, the output driver transistor 1121 is controlled by a gate voltage comprising a core voltage input value (e.g., 0.75V) when output is pulled low. This reduces the possibility of leakage current by reducing voltage drops across terminals of output transistor 1123.

FIG. 11*b* depicts a schematic diagram of a power down control circuit switch signal generation in accordance with embodiments. In some embodiments, this signal generation circuit may be implemented to control a gate terminal voltage for output transistor 1123 such that the gate terminal voltage operates within core device operating range and leakage current is minimized.

Figure 12B:
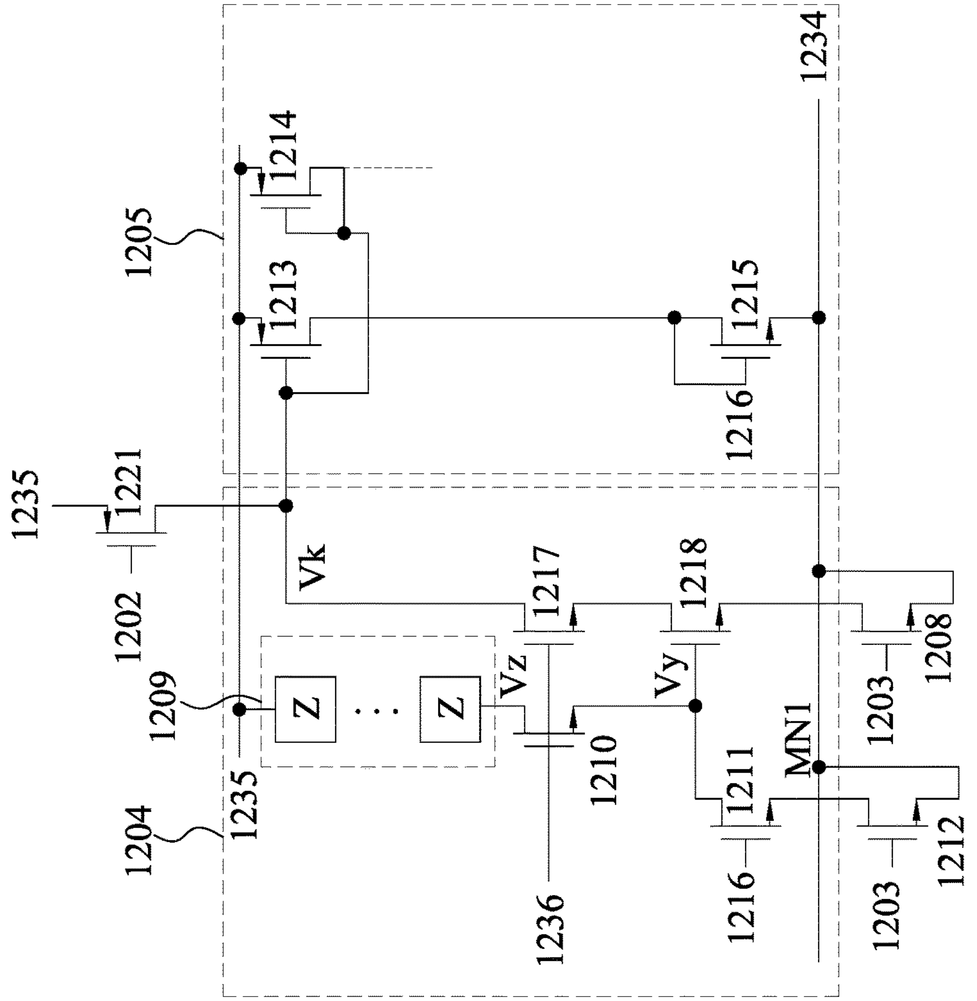
FIG. 12*b* depicts a schematic diagram of an a core-only start-up circuit for biasing an LDO feedback amplifier in accordance with embodiments.
Figure 12A:
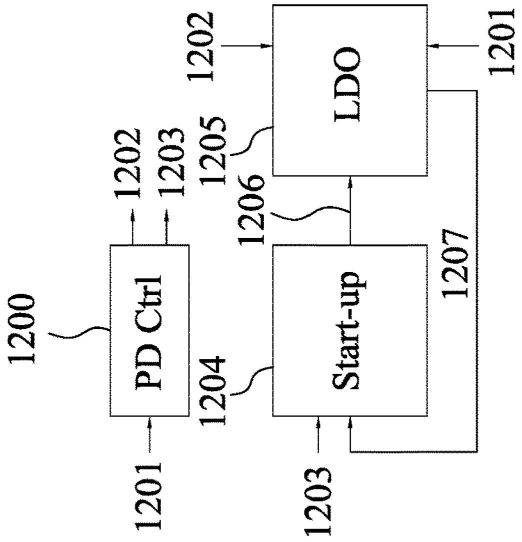
FIG. 12*a* depicts a block diagram of an a core-only start-up circuit for biasing an LDO feedback amplifier in accordance with embodiments.

FIG. 12*a* depicts a block diagram of a core-only start-up circuit for biasing an LDO feedback amplifier in accordance with embodiments. The circuit depicted in FIG. 12*a* may be used to avoid entering metastable states and failing to establish biasing current for operation. In some embodiments, a power-down control circuit 1200 receives a power-down signal 1201 as an input and outputs an inverse status voltage signal 1202 and a status voltage signal 1203. The status voltage signal 1203 is then input to a start-up circuit 1204, which sends a control signal 1206 to LDO 1205. LDO 1205 also accepts the inverse status voltage signal 1202 as an input, along with power-down signal 1201, and outputs a feedback signal 1207 back to start-up circuit 1204.

FIG. 12*b* depicts a schematic diagram of an a core-only start-up circuit for biasing an LDO feedback amplifier in accordance with embodiments, including core start-up circuit 1204 and bias circuit for LDO feedback amplifier 1205. The core start-up circuit 1204 accepts a supply voltage 1235 through a power control transistor 1221. The power control transistor 1221 has a gate electrically coupled to the inverse status voltage signal 1202, a source terminal electrically coupled to the supply voltage, and a drain terminal electrically coupled to a drain terminal of a first NMOS transistor 1217. The first NMOS transistor 1217 has a source terminal electrically coupled to a drain terminal of a second NMOS transistor 1218, which has a source terminal electrically coupled to a drain terminal of a first grounding NMOS transistor 1208. The first grounding NMOS transistor 1208 has a source terminal electrically coupled to electrical ground 1234 and a gate terminal electrically coupled to the status voltage signal 1203.

The core start-up circuit 1204 also receives the supply voltage 1235 to a first end of a resistive element bank 1209. In some embodiments, the resistive element bank 1209 can be implemented either with resistors or with MOSFET diodes with their drain and source terminals electrically coupled. Implementing the resistive element bank 1209 using MOSFET devices may have the advantage of saving space in some embodiments. The resistive element bank 1209 has a second end, which is electrically coupled to a drain terminal of a third NMOS transistor 1210. The third NMOS transistor 1210 has a source terminal electrically coupled to a gate terminal of the second NMOS transistor 1218. The third NMOS transistor 1210 has a gate terminal electrically coupled to control input voltage 1236. The source terminal of the third NMOS transistor 1210 is also electrically coupled to a drain terminal of a fourth NMOS transistor 1211. The fourth NMOS transistor 1211 has a source terminal electrically coupled to a drain terminal of a second NMOS grounding transistor 1212, which has a source terminal electrically coupled to electronic ground 1234. The second NMOS grounding transistor 1212 also has a gate terminal electrically coupled to the status voltage signal 1203.

The LDO feedback amplifier bias circuit receives the supply voltage 1235 at a source terminal for a first and second PMOS transistors 1213 and 1214, respectively. The first PMOS transistor 1213 and the second PMOS transistor 1214 have gate terminals electrically coupled to the drain terminal of the power control transistor 1221. The gate terminal of PMOS transistor 1214 is electrically coupled to a drain terminal of PMOS transistor 1214. The drain terminal of PMOS transistor 1213 is electrically coupled to a drain terminal of a third grounding NMOS transistor 1215. The third grounding NMOS transistor 1215 has a gate terminal 1216 electrically coupled to the drain terminal of grounding NMOS transistor 1215 and to a gate terminal of the fourth NMOS transistor 1211. The third grounding NMOS transistor 1215 has a source terminal electrically coupled to electronic ground 1234.

Before starting up the circuit, the gate voltage of PMOS transistor 1213 and the gate voltage 1216 for transistors 1211 and 1215 is near to the electronic ground voltage 1234. In this state, PMOS transistor 1213 is turned off and the voltage at the drain terminal of transistor 1210 is near to the supply voltage 1235. The voltage at the gate of transistor 1218 correlates with the control input voltage 1236. Therefore, as the control input voltage 1236 increases, transistor 1218 turns on, which pulls down the gate voltage of transistors 1213 and 1214, turning them both on, resulting in current being injected into grounding transistor 1215 and activating transistor 1214. As current flows through grounding transistor 1215, the voltage 1216 of the gate terminal of transistor 1215 increases, which turns on transistor 1211, resulting in the circuit completing its start-up sequence.

Figure 13A:
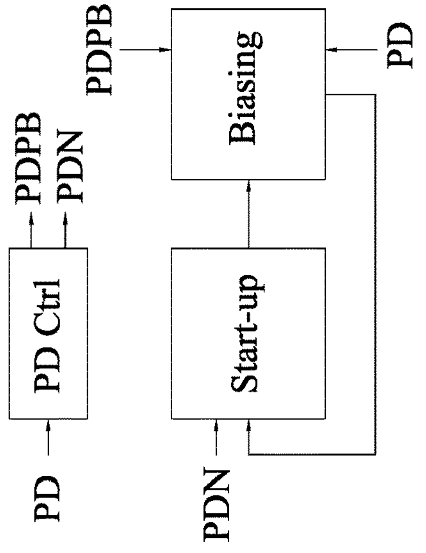
FIG. 13*a* depicts a block diagram of an a core-only start-up circuit for a constant transconductance biasing circuit in accordance with embodiments.

FIG. 13*a* depicts a block diagram of an a core-only start-up circuit for a constant transconductance biasing circuit in accordance with embodiments. The block diagram level depiction of the circuit in FIG. 13*a* corresponds exactly to the block diagram depicted in FIG. 12*a*.

Figure 13B:
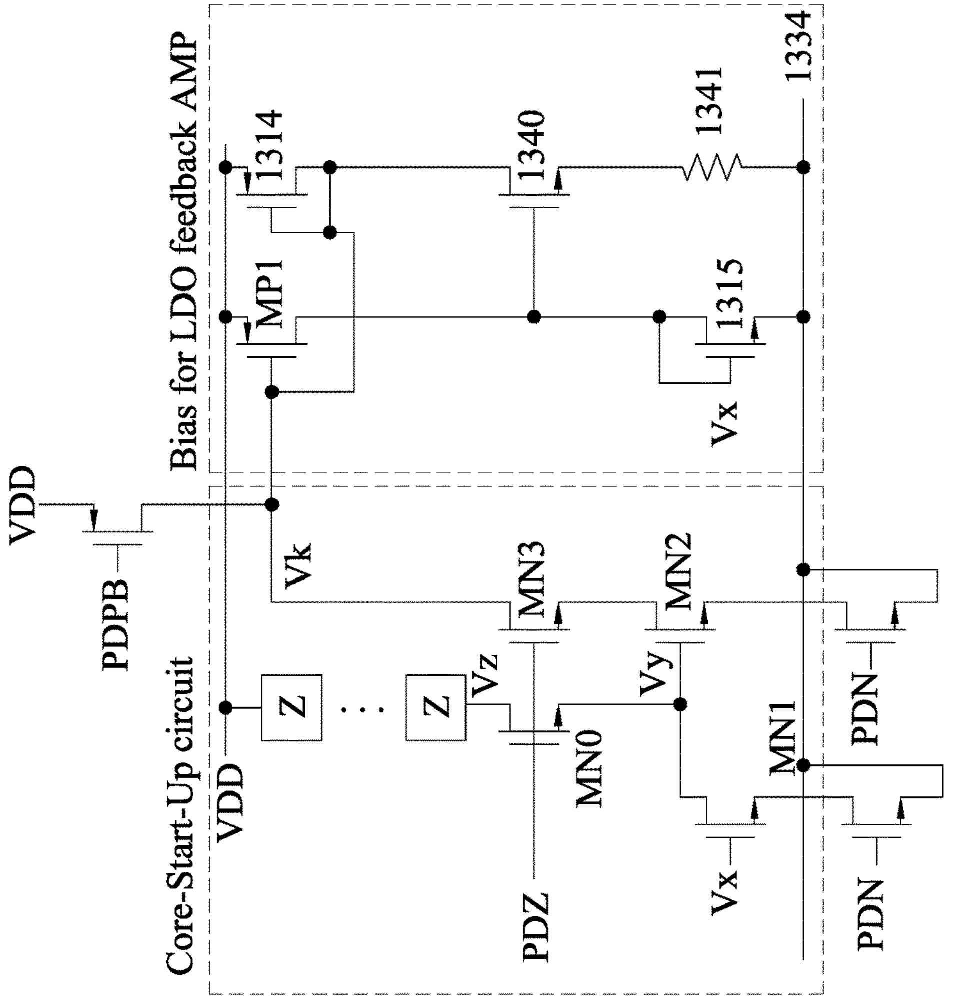
FIG. 13*b* depicts a schematic diagram of an a core-only start-up circuit for a constant transconductance biasing circuit in accordance with embodiments.

FIG. 13*b* depicts a schematic diagram of an a core-only start-up circuit for a constant transconductance biasing circuit in accordance with embodiments. The schematic diagram of the circuit in FIG. 13*b* corresponds nearly identically to the schematic diagram depicted in FIG. 12*b* with the addition of an NMOS transistor 1340 with a drain terminal electrically coupled to a drain terminal of a PMOS transistor 1314 corresponding to PMOS transistor 1214 in FIG. 12*b*. The transistor 1340 has a gate terminal electrically coupled to a drain terminal of a grounding NMOS transistor 1315, which corresponds to the grounding NMOS transistor 1215 in FIG. 12*b*. The transistor 1340 also has a source terminal electrically coupled to a first terminal of a resistive element 1341, which has a second terminal electrically coupled to an electronic ground 1334.

Figure 14B:
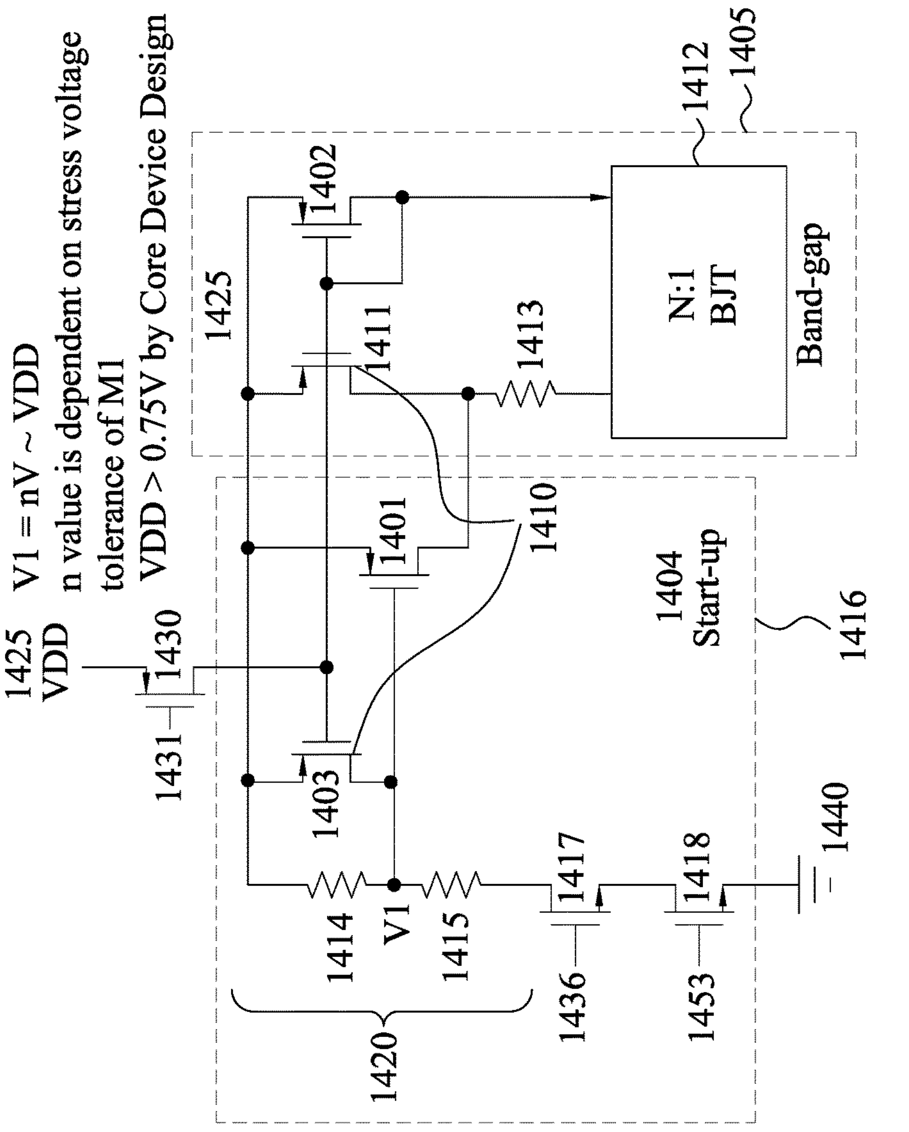
FIG. 14*b* depicts a schematic diagram of a circuit for starting up and powering down a bandgap voltage reference circuit in accordance with embodiments.
Figure 14A:
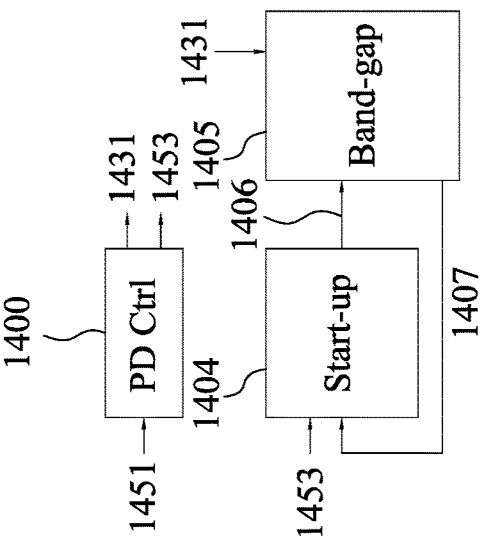
FIG. 14*a* depicts a block diagram of a circuit for starting up and powering down a bandgap voltage reference circuit in accordance with embodiments.

FIG. 14*a* depicts a block diagram of a circuit for starting up and powering down a bandgap voltage reference circuit in accordance with embodiments. The embodiment in FIG. 14*a* utilizes core only devices for a start-up circuit for band-gap design. In some embodiments, a power-down control circuit 1400 receives a power-down signal 1451 as an input and outputs an inverse status voltage signal 1431 and a status voltage signal 1453. The status voltage signal 1453 is then input to a start-up circuit 1404, which sends a control signal 1406 to band-gap 1405. Band-gap 1405 also accepts the inverse status voltage signal 1431 as an input, and outputs a feedback signal 1407 back to start-up circuit 1404.

FIG. 14*b* depicts a schematic diagram of a circuit for starting up and powering down a bandgap voltage circuit in accordance with embodiments. A first terminal of a voltage divider circuit 1420 is electrically coupled to a supply voltage 1425. A second terminal of the voltage divider 1420 is electrically coupled to electronic ground 1440 through NMOS transistors 1417 and 1418. A gate terminal of a first PMOS transistor 1401 is electrically coupled to a midpoint of the voltage divider 1416 and to a drain of a first PMOS transistor 1403 of a current-mirror pair 1410. A source terminal of the first PMOS transistor 1403 is electrically coupled to the supply voltage 1425 and a gate terminal of the first PMOS transistor 1403 is electrically coupled to a gate terminal of a second PMOS transistor 1411 of the current-mirror pair 1410. A source terminal of the first PMOS transistor 1401 is electrically coupled to the supply voltage 1425. A source terminal of the second PMOS transistor 1411 is electrically coupled to the supply voltage 1425, as well as a source terminal of a second PMOS transistor 1402. A gate terminal of the second PMOS transistor 1402 is electrically coupled to a drain terminal of the second PMOS transistor 1402 as well as a gate terminal of the second PMOS transistor 1411 and a first terminal of BJT cells 1412. A second terminal of BJT cells 1412 is electrically coupled to a drain terminal of the second PMOS transistor 1411 and a drain terminal of the first PMOS transistor 1401 through resistor 1413. A drain terminal of a power control circuitry PMOS transistor 1430 is electrically coupled to the gate terminal of the first PMOS transistor 1430. A source terminal of the power control circuitry PMOS transistor 1430 is electrically coupled to the supply voltage 1425 and a gate terminal of the power control circuitry PMOS transistor 1430 is electrically coupled to a power-down signal input 1431. A grounding transistor 1418 receives a status voltage signal 1453 as an input to a gate terminal and has a source terminal electrically coupled to the electronic ground 1440. The grounding transistor 1418 has a drain terminal electrically coupled to a source terminal of an NMOS transistor 1417, with a gate terminal electrically coupled to control input signal 1436 and a drain terminal electrically coupled to a second end of voltage divider 1420.

When powering on, the first PMOS transistor 1401 is turned on first, which results in current being injected into the BJT cells 1412. This results in the voltage of the gate of the second PMOS transistor 1402 dropping from its initial state at the supply voltage due to the current draw by the BJT cells 1412. As the gate of PMOS transistor 1402 is electrically coupled to the gate terminal of the first NMOS transistor 1403, the first NMOS transistor 1403 is turned on, which pulls up the gate of the first PMOS transistor 1401, which shuts down the first PMOS transistor 1401 without disturbing the current balance.

Figure 15:
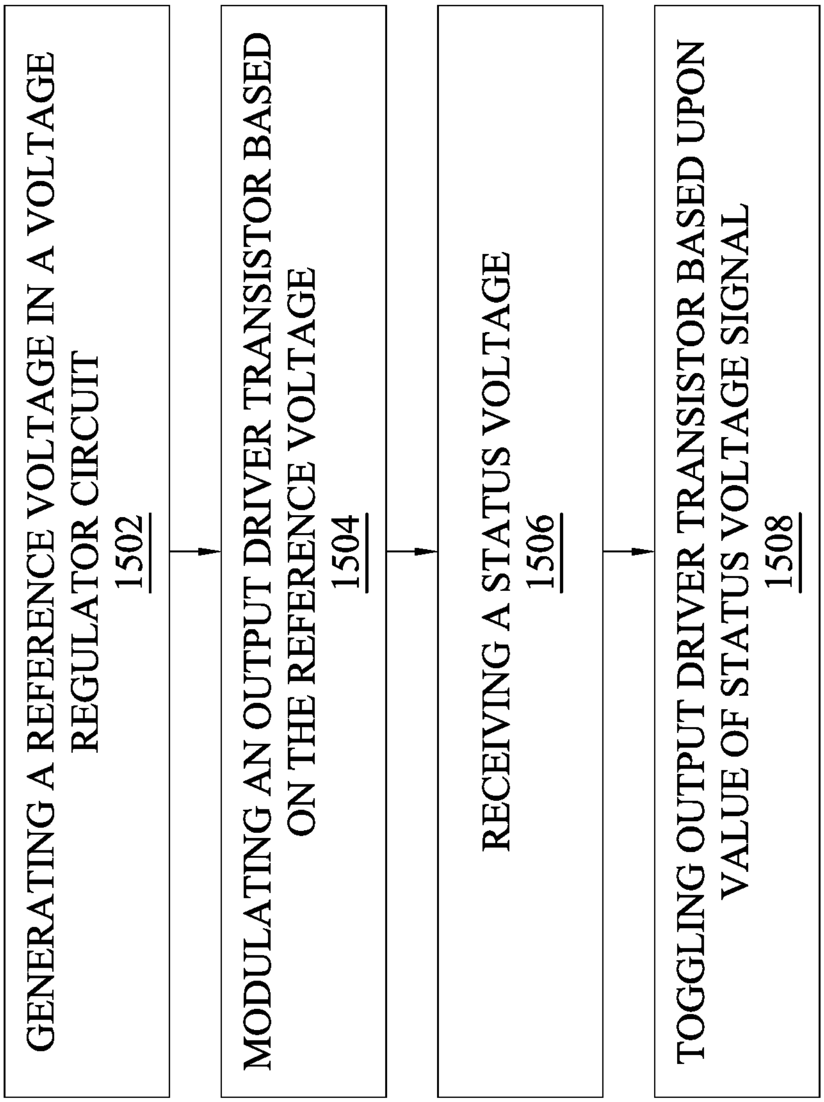
FIG. 15 depicts a flow diagram of a process for starting up and powering down a voltage reference circuit in accordance with embodiments.

FIG. 15 is a flow diagram depicting depicts a method for starting up and powering down a voltage regulator circuit in accordance with embodiments. At 1502, a reference voltage is generated in a voltage regulator circuit. At 1504, an output driver transistor is modulated based upon the reference voltage generated by the voltage regulator circuit. A status voltage signal is received at 1506, and at 1508, the output driver transistor is turned on or off based upon the value of the status voltage signal.

Systems and methods as described herein may take a variety of forms. In one example, systems and methods are provided for a circuit for powering a voltage regulator. A voltage regulator circuit has an output electrically coupled to a gate of an output driver transistor, the output driver transistor having a first terminal electrically coupled to a voltage source and a second terminal electrically coupled to a first terminal of a voltage divider, the voltage divider having an second terminal electrically coupled to ground, and the voltage divider having an output of a stepped down voltage. A power control circuitry transistor has a first terminal electrically coupled to the voltage source, the power control circuitry transistor having a second terminal electrically coupled to the gate terminal of the output driver transistor, and the power control circuitry transistor having a gate terminal electrically coupled to a status voltage signal.

In another example, in a method for starting up and powering down a voltage regulator circuit, a reference voltage is generated in a voltage regulator circuit. An output driver transistor is modulated based upon the reference voltage generated by the voltage regulator circuit. A status voltage signal is received, and the output driver transistor is turned on or off based upon the value of the status voltage signal.

As a further example, a circuit includes a voltage divider circuit having a first terminal electrically coupled with a voltage source and a second terminal electrically coupled to ground. A first and second PMOS transistor are included, where the first PMOS transistor has a gate terminal electrically coupled to a midpoint of the voltage divider and a first terminal of a first NMOS transistor of a current-mirror pair, the first NMOS transistor having a second terminal electrically coupled to the voltage source, and the second PMOS transistor having a gate terminal electrically coupled to a gate terminal of the first NMOS transistor and a first terminal of the first PMOS transistor, and the voltage source and a first terminal of the second PMOS transistor as well as a first terminal of a BJT having a first and second terminal. The second terminal of the BJT is electrically coupled to a second terminal of the first PMOS transistor through a resistor. The second terminal of the first PMOS transistor is electrically coupled to a first terminal of the second NMOS transistor of the current-mirror pair. The second NMOS transistor of the current-mirror pair has a second terminal electrically coupled to the voltage source and a gate terminal electrically coupled to the gate terminal of the first NMOS and a first terminal of a power control circuitry PMOS transistor, and the power control circuitry PMOS transistor has a second terminal electrically coupled to the voltage source and a gate terminal electrically coupled to a power-down signal input.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit comprising:

an output driver including:

a voltage divider;

an output driver transistor; and an output transistor having a first terminal electrically coupled to a first terminal of the output driver transistor and a second terminal electrically coupled to a first terminal of the voltage divider;

a voltage regulator circuit electrically coupled to the output driver;

a power control circuitry transistor electrically coupled to the output driver; and a power down control circuit having a first output comprising a constant voltage output that is electrically coupled to the output transistor.

2. The circuit of claim 1, wherein the voltage regulator is a low-dropout voltage regulator.

3. The circuit of claim 1, further comprising a capacitor in parallel to the voltage divider.

4. The circuit of claim 1, wherein the power down control circuit further comprises an input electrically coupled to a power-down input signal and a second output electrically coupled to a status voltage signal.

5. The circuit of claim 4, wherein the constant voltage output is electrically coupled to a gate of the output transistor.

6. The circuit of claim 5, wherein the constant voltage output is generated by a control voltage divider circuit, the control voltage divider circuit includes a first resistive element having a first terminal electrically coupled to a voltage source and a second terminal electrically coupled to the constant voltage output and a first terminal of a second resistive element, and the second resistive element has a second terminal electrically coupled to ground.

7. The circuit of claim 1, further comprising a grounding transistor having a first terminal electrically coupled to the voltage regulator, a second terminal electrically coupled to ground, and a gate terminal electrically coupled to a status voltage signal.

8. The circuit of claim 1, wherein the voltage divider comprises first and second resistors, the first resistor has a first terminal electrically coupled to the second terminal of the output transistor and a second terminal electrically coupled to a first terminal of the second resistor, and the second resistor has a second terminal electrically coupled to ground.

9. A method comprising:

receiving a status voltage signal;

turning an output driver transistor on or off based upon the status voltage signal;

tuning an output transistor having a first terminal electrically coupled to a first terminal of the output driver transistor and a second terminal electrically coupled to a first terminal of a voltage divider; and generating an output voltage based on a sum of resistances of resistors of the voltage divider.

10. The method of claim 9, wherein the output voltage is proportional to the sum of resistances of the resistors of the voltage divider divided by a sum of a resistance of the output transistor and the resistances of the resistors of the voltage divider.

11. The method of claim 9, further comprising driving a load at an output of an output driver, wherein the output driver includes the output driver transistor, the output transistor, and the voltage divider.

12. The method of claim 9, further comprising turning the output driver transistor on or off by controlling a power control circuitry transistor using the status voltage signal.

13. The method of claim 9, further comprising turning a voltage regulator on or off by controlling a power control circuitry transistor using the status voltage signal.

14. The method of claim 9, further comprising turning a power control circuitry transistor on to ground a charge in a voltage regulator based upon the status voltage signal.

15. The method of claim 14, further comprising generating a second status voltage signal to control a second power control circuitry transistor.

16. A circuit comprising:

a start-up circuit including:

a voltage divider;

first and second transistors, the first transistor having a gate terminal electrically coupled to a midpoint of the voltage divider and a first terminal of the second transistor;

a band-gap circuit electrically coupled to the start-up circuit; and a power control circuitry transistor having a first terminal electrically coupled to a gate terminal of the second transistor.

17. The circuit of claim 16, wherein the first transistor of the start-up circuit further has a first terminal electrically coupled to a first terminal of a transistor of the band-gap circuit.

18. The circuit of claim 17, wherein the band-gap circuit further includes a resistor electrically coupled to the first terminal of the transistor of the band-bap circuit.

19. The circuit of claim 16, wherein the start-up circuit further includes a third transistor having a first terminal electrically coupled to the voltage divider.

20. The circuit of claim 19, wherein the start-up circuit further includes a fourth transistor having a first terminal electrically coupled to a second terminal of the third transistor.

* * * * *